United States Patent Office 3,843,545
Patented Oct. 22, 1974

3,843,545
WATER STERILIZING COMPOSITION
AND TABLETS
Kevin Hague Heuston, Tasmania, Australia, assignor to Commonwealth of Australia, % Department of the Army, Canberra, Australian Capital Territory
No Drawing. Filed Jan. 23, 1973, Ser. No. 326,148
Claims priority, application Australia, Jan. 27, 1972, 7,782
Int. Cl. C02b 1/34
U.S. Cl. 252—181                                    7 Claims

ABSTRACT OF THE DISCLOSURE

A composition for sterilizing water comprises an oxidizing agent, an acid, an iodide and an iodate. Suitable active ingredients are potassium dichromate and/or permanganate; tartaric, citric and/or adipic acid; sodium and/or potassium iodide; sodium and/or potassium iodate. A preferred embodiment provides a small tablet capable of sterilizing water for human consumption.

BACKGROUND OF THE INVENTION

The need for sterilization of water for drinking and other purposes, e.g. for use in swimming pools, has demanded chemical compositions that are effective and convenient in use, while remaining physiologically tolerable. Chlorine-based compositions have been extensively used in the prior art.

GENERAL DESCRIPTION

The present invention provides a composition for sterilizing water, comprising an oxidizing agent, an acid, an iodide and an iodate. Suitable active ingredients are potassium dichromate and/or permanganate; tartaric, citric and/or adipic acid; sodium and/or potassium iodide; sodium and/or potassium iodate. A preferred embodiment provides a small tablet capable of sterilizing water for human consumption.

Although the present application does not wish to be restricted to any hypothetical mechanism for the effectiveness of this composition, it is believed that the sterilizing power thereof is derived from liberated iodine and the oxidizing agent, with the major ingredient being liberated iodine.

In practical use it is preferred that sufficient of the composition be added to water to give a liberated iodine content of about 8 parts per million.

Preferred proportions in parts by weight are:

Oxiding agent _____ 1 to 5
Acid _____ 10 to 50
Iodide _____ 10 to 50
Iodate _____ 10 to 50

When the composition is used for sterilizing water for human consumption, it is preferred that pure ingredients be used, as impure ingredients may give an effective composition with undesirable side effects.

The composition is preferably prepared in tablet form in admixture with disintegrating agents such as synthetic resins and/or carboxymethyl cellulose and an excipient such as lactose.

A preferred embodiment of the invention provides a tablet containing ingredients as specified above, having less than 10 parts and preferably less than 4 parts (2 percent by weight) by weight moisture, and excipient and disintegrating agent to make up a total tablet weight of 100 parts.

The excipient and disintegrating agent are chosen in accordance with well-known criteria so as to give the desired physical properties. Furthermore, as iodine is itself volatile, at moderate temperatures, it may be advisable to vary the relative amounts of oxidizing agent and iodine-liberating agents employed, if extended storage and/or tropical temperatures are contemplated, on the basis that any loss of iodine on storage (and consequent loss of sterilizing power) may be partially compensated by the oxidizing agent which also has sterilizing power due to its oxidizing properties.

EXAMPLE 1

Tablets were prepared from the following chemically pure ingredients conforming to British Pharmacopoeia standards, ground to pass a 40 mesh British Standard Specification sieve prior to mixing. The composition of each tablet was:

Potassium permanganate____ about 0.001 gm.
Citric acid_____ about 0.02 gm.
Potassium iodide_____ about 0.02 gm.
Sodium iodate_____ about 0.01 gm.
Moisture_____ less than 0.01 gm.
Excipient and                to make up a total tablet
  disintegrating agent_____ weight of about 0.20 gm.

The sterilizing power was determined as follows:
(a) One tablet was added to 1 litre of moderately contaminated water, and allowed to stand for five minutes. It was then shaken and allowed to stand a further 20 minutes. The total plate count and coliform organisms were determined using multiple tube method or membrane filter method. The number of colonies detected were recorded as A.

(b) The total plate count and coliforms on untreated water were determined by the same method. The number of colonies detected were recorded as B.

$$\text{Killing Power} = \frac{B-A}{B} \times 100 \text{ per cent.}$$

The results of this determination are given in Table 1.

TABLE 1

| | | Coliforms |
|---|---|---|
| (a) | Untreated water | >11,000 per ml. |
| (b) | Treated water | NIL per ml. |
| (c) | Percentage kill (coliform org.) | >99.9 percent. |

This tablet had a disintegrating time of less than 5 minutes determined by the following method: (a) 1 litre of water was taken and its temperature adjusted to 20° C.±1°. One tablet was added and shaken vigorously. Timing was commenced, and after 5 minutes the tablet was completely disintegrated.

EXAMPLE 2

A tablet similar to Example 1 was made using potassium iodate, about 0.012 gm., in place of the sodium iodate. The effectiveness of this tablet was equal to that of the tablet of Example 1.

What is claimed is:
1. A composition for sterilizing water consisting essentially of:
   (a) 1 to 5 parts by weight of an oxidizing agent selected from the group consisting of potassium dichromate, potassium permanganate and mixtures thereof;
   (b) 10 to 50 parts by weight of at least one acid selected from the group consisting of tartaric, citric and adipic acids;
   (c) 10 to 50 parts by weight of an iodide chosen from the group consisting of sodium iodide, potassium iodide and mixtures thereof;

(d) 10 to 50 parts by weight of an iodate chosen from the group consisting of sodium iodate, potassium iodate and mixtures thereof.

2. A tablet for sterilizing water consisting essentially of the following active ingredients in parts by weight:

| | |
|---|---|
| Potassium dichromate and/or potassium permanganate | 1 to 5 |
| Tartaric—acid and/or citric acid and/or adipic acid | 10 to 50 |
| Sodium iodide and/or potassium iodide | 10 to 50 |
| Sodium iodate and/or potassium iodate | 10 to 50 | and additionally containing less than 4 parts by weight of moisture.

3. A tablet for sterilizing water, said tablet having a total weight of about 0.20 gm. and consisting essentially of the following active ingredients:

| | Gm. |
|---|---|
| Potassium permanganate | about 0.001 |
| Citric acid | about 0.02 |
| Potassium iodide | about 0.02 |
| Sodium iodate | about 0.01 | and additionally containing less than 0.01 gm. of moisture

4. A tablet for sterilizing water, said tablet having a total weight of about 0.20 gm. and consisting essentially of the following active ingredients:

| | Gm. |
|---|---|
| Potassium permanganate | about 0.001 |
| Citric acid | about 0.02 |
| Potassium iodide | about 0.02 |
| Potassium iodate | about 0.01 | and additionally containing less than 0.01 gram of moisture.

5. A tablet for sterilizing water for human consumption, said tablet consisting essentially of, based on about 200 parts by weight, of the following active ingredients in parts by weight:

| | |
|---|---|
| Potassium dichromate and/or potassium permanganate | 1 to 5 |
| Tartaric—acid and/or citric acid and/or adipic acid | 10 to 50 |
| Sodium iodide and/or potassium iodide | 10 to 50 |
| Sodium iodate and/or potassium iodate | 10 to 50 | together with less than 10 parts by weight of moisture.

6. A tablet according to claim 5, wherein the moisture content of said tablet is no greater than 2 percent by weight.

7. Composition according to claim 1, wherein the composition additionally contains carboxymethylcellulose as a disintegrating agent and lactose as an excipient.

References Cited

UNITED STATES PATENTS

| 3,288,708 | 11/1966 | Cordle | 210—62 |
| 3,173,864 | 3/1965 | Freeman | 252—181 |
| 3,215,627 | 11/1965 | Tools | 210—62 |

RALPH S. KENDALL, Primary Examiner

B. H. HESS, Assistant Examiner

U.S. Cl. X.R.

252—186; 210—63 and 64